US011403034B1

(12) United States Patent
Moertl et al.

(10) Patent No.: US 11,403,034 B1
(45) Date of Patent: Aug. 2, 2022

(54) NON-VOLATILE STORAGE CLASS MEMORY DATA FLOW WITH MISMATCHED BLOCK SIZES

(71) Applicant: International Business Machines Corporation, Armonk, NY (US)

(72) Inventors: Daniel Frank Moertl, Rochester, MN (US); Robert Edward Galbraith, Rochester, MN (US); Damir Anthony Jamsek, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/345,291

(22) Filed: Jun. 11, 2021

(51) Int. Cl.
*G06F 3/06* (2006.01)
*G06F 12/128* (2016.01)
*G06F 13/16* (2006.01)

(52) U.S. Cl.
CPC .......... *G06F 3/0656* (2013.01); *G06F 3/0604* (2013.01); *G06F 3/0679* (2013.01); *G06F 12/128* (2013.01); *G06F 13/1673* (2013.01); *G06F 2212/283* (2013.01)

(58) Field of Classification Search
CPC .... G06F 3/0656; G06F 3/0604; G06F 3/0679; G06F 12/0897; G06F 12/0811; G06F 12/128; G06F 13/1673; G06F 13/1668; G06F 13/1694; G06F 2212/27; G06F 2212/283
See application file for complete search history.

(56) References Cited

U.S. PATENT DOCUMENTS

| 9,513,904 | B2 * | 12/2016 | Godard | G06F 12/0811 |
| 9,996,478 | B1 * | 6/2018 | Fowler | G06F 12/0888 |
| 10,013,346 | B2 | 7/2018 | Dubeyko | |
| 10,126,986 | B2 | 11/2018 | Jung et al. | |

(Continued)

OTHER PUBLICATIONS

Kang, et al., "Performance Trade-Offs in Using NVRAM Write Buffer for Flash Memory-Based Storage Devices", IEEE Transactions on Computers, Jun. 2009, © 2009 IEEE, DOI: 10.1109/TC.2008.224, 16 pgs., vol. 58, No. 6., <https://www.researchgate.net/publication/220332292>.

(Continued)

*Primary Examiner* — Idriss N Alrobaye
*Assistant Examiner* — Richard B Franklin
(74) *Attorney, Agent, or Firm* — David K. Mattheis; Maeve Carpenter

(57) ABSTRACT

In an approach to NV SCM data flow with mismatched block sizes, responsive to receiving a command from a host on a memory controller for a storage class memory, whether the command is a write command is determined. Responsive to determining that the command is the write command, the command is inserted into a first buffer. Responsive to the command exiting the first buffer, whether the command generates a cache hit from the internal cache is determined. Responsive to determining that the command generates the cache hit, the write data is written into the internal cache. Responsive to determining that the command does not generate the cache hit, whether an oldest page in the internal cache is dirty is determined. Responsive to determining that the oldest page in the internal cache is dirty, a modified oldest page is written to the internal cache and a second buffer.

20 Claims, 8 Drawing Sheets

(56) References Cited

U.S. PATENT DOCUMENTS

| | | |
|---|---|---|
| 10,296,426 B2 | 5/2019 | Shi |
| 10,379,782 B2 | 8/2019 | Nagarajan |
| 10,559,344 B2 | 2/2020 | Luo |
| 10,628,301 B1 | 4/2020 | Ben-Yehuda |
| 10,795,586 B2 | 10/2020 | Li |
| 10,915,443 B2 | 2/2021 | Bahirat |
| 2019/0042146 A1 | 2/2019 | Wysoczanski |
| 2020/0117397 A1 | 4/2020 | Li |
| 2020/0225851 A1 | 7/2020 | Klein |
| 2021/0042226 A1 | 2/2021 | Ware |

OTHER PUBLICATIONS

Kim, et al., "BPLRU : A Buffer Management Scheme for Improving Random Writes in Flash Storage", FAST '08: 6th USENIX Conference on File and Storage Technologies, 2008, 14 pgs., Software Laboratory of Samsung Electronics, Korea.

Kim, et al., "HMB-SSD: Framework for Efficient Exploiting of the Host Memory Buffer in the NVMe SSD", IEEE Access, Oct. 2019, © 2019, Digital Object Identifier 10.1109/ACCESS.2019.2947350, 9 pgs., South Korea.

Lee, et al., "FESSD: A Fast Encrypted SSD Employing On-Chip Access-Control Memory", IEEE Computer Architecture Letters, Jul.-Dec. 2017, © 2017 IEEE, Digital Object Identifier No. 10.1109/LCA.2017.2667639, 4 pgs., vol. 16, No. 2.

Ustiugov, et al., "Design Guidelines for High-Performance SCM Hierarchies", The International Symposium on Memory Systems (MEMSYS), arXiv:1801.06726v4 [cs.AR] Mar. 7, 2019, © 2018 Association for Computing Machinery, 16 pgs., Old Town Alexandria, VA, USA, <https://doi.org/10.1145/3240302.3240310>.

* cited by examiner

NON-VOLATILE STORAGE CLASS MEMORY DATA FLOW WITH MISMATCHED BLOCK SIZES

BACKGROUND

The present invention relates generally to the field of semiconductor-based storage devices, and more particularly to non-volatile storage class memory data flow with mismatched block sizes.

Storage Class Memory (SCM) is a form of Non-Volatile (NV) storage that is typically created out of NAND flash or Phase-Change Memory (PCM). It is an intermediate step between high-performance Dynamic Random-Access Memory (DRAM) and cost-effective Hard Disk Drive (HDDs). It can provide write performance that is significantly faster than HDD technology and read performance similar to DRAM.

SCM is a persistent memory that acts as a compromise between Solid-State Drive (SSD) and DRAM features. Even though both DRAM and NAND SSDs are made of solid-state chips and both are under the umbrella of solid-state storage, they have completely different roles. SSDs are mainly used for storage and RAM is used to perform calculations and operations from the storage retrieved from the primary storage.

SCM is a new tier of memory/storage that is at the top of DRAM and at the bottom of NAND flash. SCM offers fast non-volatile memory to the processor, with speeds slightly below DRAM but still vastly above those of even the fastest NAND flash storage, while at the same time having capacities at the scale of NAND flash drives.

SUMMARY

Embodiments of the present invention disclose a method, a computer program product, and a system for NV SCM data flow with mismatched block sizes. In one embodiment, responsive to receiving a command from a host on a memory controller for a storage class memory, whether the command is a write command is determined. Responsive to determining that the command is the write command, the write command is inserted into a first buffer, where the write command contains a write data, and further where the first buffer holds the write command prior to storing the write data in an internal cache. Responsive to the write command exiting the first buffer, whether the write command generates a cache hit from the internal cache is determined, where the cache hit indicates that an address of the write data in the write command is in the internal cache. Responsive to determining that the write command generates the cache hit from the internal cache, the write data is written into the internal cache. Responsive to determining that the write command does not generate the cache hit from the internal cache, whether a first oldest page in the internal cache is dirty is determined, where the first oldest page in the internal cache is dirty if it has been modified since it was read from a storage media. Responsive to determining that the first oldest page in the internal cache is dirty, a modified first oldest page is written to the internal cache and a second buffer, wherein the second buffer holds one or more pages cast out from the internal cache, and further wherein the modified first oldest page is a most current page updated with a modified data from the internal cache.

DETAILED DESCRIPTION

Figure 1:
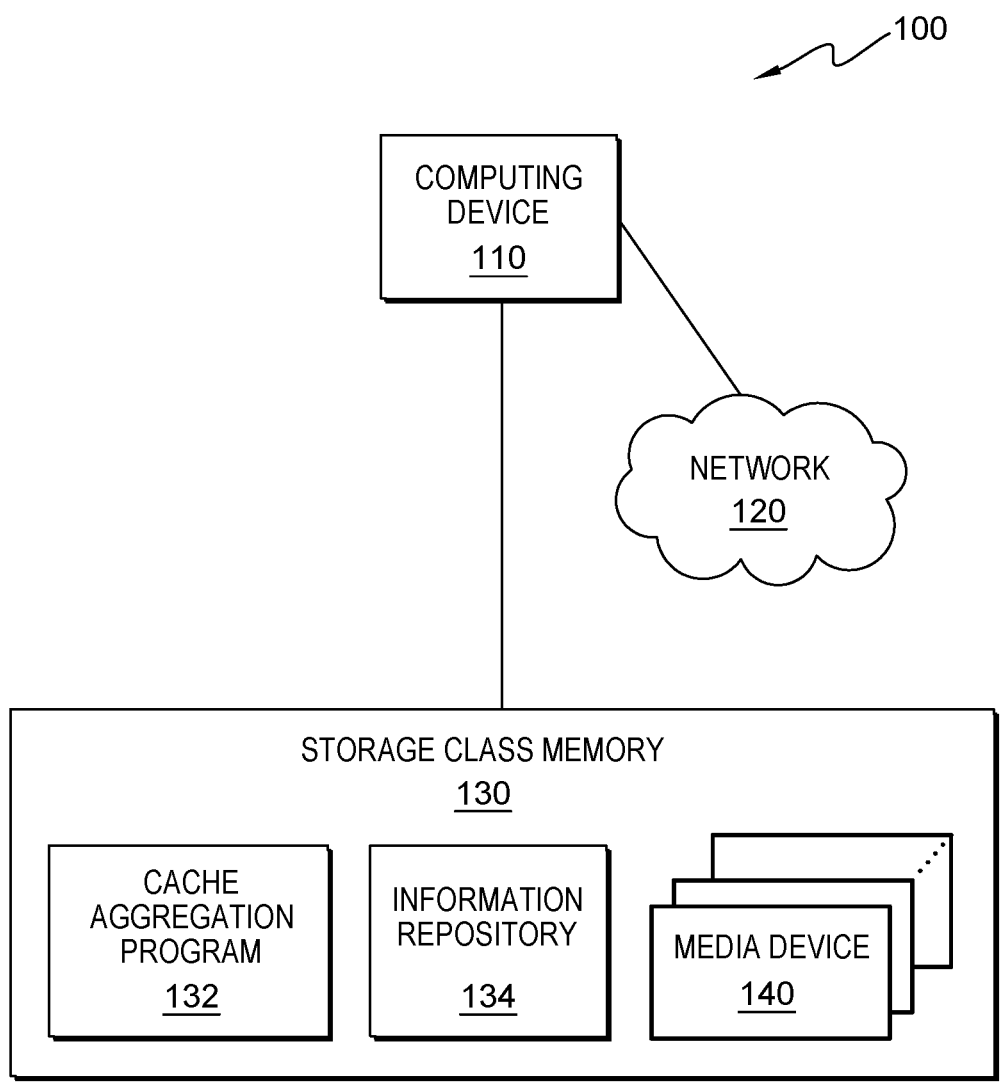
FIG. 1 is a functional block diagram illustrating a distributed data processing environment, in accordance with an embodiment of the present invention.

An SCM connects to a host system via interfaces such as Open Memory Interface (OMI), OpenCAPI, or Peripheral Component Interconnect Express (PCIe) Compute Express Link (CXL) CXL.mem. The maximum block sizes of these interfaces are typically 64B or 128B. A DRAM SCM can achieve DRAM DIMM performance. An NV SCM media, such as NAND Flash or Phase-Change Memory (PCM), will not approach the performance of DRAM, due to the device characteristics of latency, bandwidth, block size, and endurance, and will require a complicated controller to mitigate these device characteristics.

NV SCM media has a write endurance limit preventing write in place and requiring write balancing mechanisms. This requires a layer of address translation between the host and the media. This makes media writes costly, and write amplification needs to be avoided. Write amplification is the ratio of the actual data written to the flash versus the data requested by the host to write to the device. Write amplification occurs because the flash device is internally organized in pages and data can be written to it only on a page-by-page basis.

When the media block size is larger than the host accesses, the controller needs to manage this difference. For example, NAND flash read page size is typically 2 KB (kilobytes) to 32 KB, while the program page size is typically 8× the read page size. The host typically issues read or write accesses in 64B or 128B blocks, and media Read-Modify-Write (RMW) operations need to be avoided. A host thread may issue sequential accesses, but due to the large number of active threads running in the host, the host accesses at the SCM appear random.

The present invention addresses these concerns and provides a high-performance NV SCM. The present invention is described using NAND flash for the media, but also works for PCM. The present invention aggregates Fast Write Buffer (FWB), an internal cache, an Aging Write Buffer (AWB), a Media Write Buffer (MWB), and a read cache to overcome media write amplification, bandwidth limits, and latency limits. The present invention also includes a mechanism to introduce increased host response delays when the SCM is over-utilized by the host.

Host memory blocking events tend to create a burst of write traffic which needs to be serviced fast. To address this an FWB is added in front of the internal cache. In an embodiment, the FWB contains a data FIFO the size of which can be statically changed from 512 entries up to 4096 entries, an entry typically being a 128B write. When a write enters the FWB data FIFO, a write done acknowledged is inserted into a host write done FIFO. Data is passed from the FWB to the internal cache as fast as possible.

In an embodiment, the present invention removes a host write acknowledge entry from the done FIFO and sent to the host at a variable rate determined by the fullness of the FWB data FIFO. In an embodiment, this rate is immediate when the FWB FIFO is less than ⅛ full, the rate is a time delay interval of one entry every N*Y clock cycles (N=fullness of FWB FIFO, Y=constant) when the FWB FIFO is ⅛< but <⅞ full, and no entries are removed from the done FIFO when the FWB is greater than ⅞ full.

In an embodiment, three hash counting Bloom filters are used to detect the rare case of a read hitting an entry in the FWB. When that event occurs, then the read operation is added to the write FIFO. Since the write entry was added to the FWB FIFO before the read operation, when the read operation exits the FIFO, the write operation must have already exited the FIFO.

In an embodiment, the controller implements a fully associative write back cache between the host and the media. In an embodiment, this cache may be 1 MB of SRAM. In an embodiment, the internal cache cast-outs, or populates, are 2 KB bursts, while host accesses are 64B/128B accesses. In an embodiment, each cache entry is 2 KB with 32 dirty bits. Over a short span of time, the same pages can be cast out of the internal cache multiple times, which would result in media write amplification. To reduce this media write amplification, an Ageing Write Buffer (AWB) is added between the internal cache and the MWB. In an embodiment, a cast-out will first go into the AWB. Since the same page can be written multiple times to the AWB, when a page is removed from the AWB it will only be written to the MWB and media if it is the most current version of that page, while the others are discarded. This reduces the media write amplification. In an embodiment, the AWB is a circular FIFO in DRAM. In an embodiment, the AWB has a threshold value, and the present invention will remove entries from the end of the AWB when the number of entries in the AWB is larger than the threshold value. In an embodiment, if an entry being removed is not the most current (i.e., the media translate table entry does not point to it), then it is a duplicate entry and it is discarded. This reduces unneeded writes to the media.

In an embodiment, the MWB is added to avoid NAND open page reads. In an embodiment, the MWB is DRAM based. In an embodiment, all AWB cast-outs are written to both the MWB and to the media. In an embodiment, if a later read targets a recently written page then the data is read from the AWB or MWB. In an embodiment, the MWB stores a copy of all the open block writes that are on the media. In an embodiment, a single tag points to a large area of DRAM, the size of which must hold the number of pages in a block times the number of blocks in a RAID stripe. This area is filled with write data as the pages are written. Once a block is fully written, the present invention will release that data from the MWB. A CAM holds the Tag to Virtual Addressed translate, so the present invention can release this large DRAM area with a single store command.

The present invention includes a read cache to speed up the internal cache repopulate of a non-dirty page that was cast out and then later reloaded due to internal cache thrashing. In an embodiment, the read cache is a circular FIFO, typically in DRAM. In an embodiment, all media reads that are used to populate the internal cache will also populate the read cache.

In an embodiment, the media translate table is indexed by the host address. In an embodiment, an entry points to the location on the media of the data, and, if the data is in the AWB, MWB or read cache, that location of the data as well.

FIG. 1 is a functional block diagram illustrating a distributed data processing environment, generally designated 100, suitable for operation of cache aggregation program 132 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

Distributed data processing environment 100 includes SCM 130. Although only a single SCM is shown in FIG. 1, distributed data processing environment 100 may contain any number of SCMs.

In an embodiment, SCM 130 includes media device 140, which are the actual memory devices in SCM 130. In an embodiment, SCM 130 may include any number of media devices 140. In an embodiment, media device 140 is a flash memory device. In another embodiment, flash device 140 may be a PCM device. In yet another embodiment, flash device 140 may be any other storage class memory device.

In an embodiment, SCM 130 includes cache aggregation program 132. In an embodiment, cache aggregation program 132 is a program, application, or subprogram of a larger program for NV SCM data flow with mismatched block sizes.

In an embodiment, SCM 130 includes information repository 134. In an embodiment, information repository 134 may be managed by cache aggregation program 132. In an alternate embodiment, information repository 134 may be managed by the operating system of the device, alone, or together with, cache aggregation program 132. Information repository 134 is a data repository that can store, gather, compare, and/or combine information. In some embodiments, information repository 134 is located externally to SCM 130 and accessed through a communication network, such as network 120. In some embodiments, information repository 134 resides on SCM 130. In some embodiments, information repository 134 may reside on another computing device (not shown), provided that information repository 134 is accessible by SCM 130. Information repository 134 includes, but is not limited to, host data, memory configuration data, block data, cache data, buffer data, media configuration data, and other data that is received by cache aggregation program 132 from one or more sources, and data that is created by cache aggregation program 132.

Figure 2:
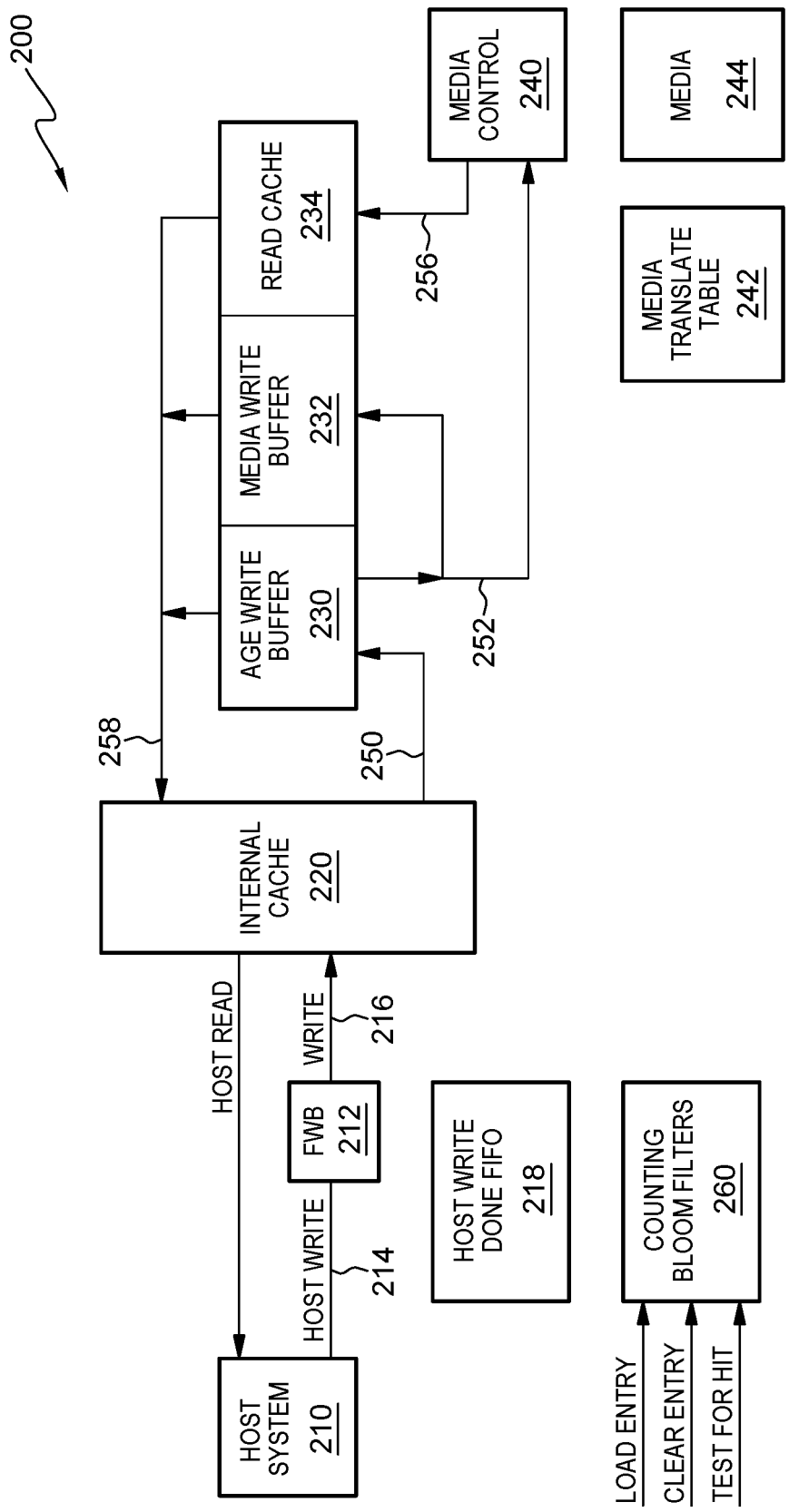
FIG. 2 is a functional block diagram illustrating an example of the cache organization of a storage class memory, in accordance with an embodiment of the present invention.

FIG. 2 is a functional block diagram illustrating an example of the cache organization of an SCM, e.g., SCM 130 from FIG. 1, generally designated 200, in accordance with an embodiment of the present invention. It should be appreciated that the diagram depicted in FIG. 2 illustrates one possible example of the cache organization of a storage class memory. Many modifications to the depicted organization may be made by those skilled in the art without departing from the scope of the invention as recited by the claims.

FIG. 2 includes Host System 210, the host that issues host read and write requests. Although a single host is shown in the example of FIG. 2, distributed data processing environment 100 may contain any number of hosts. Internal Cache 220 is the first level cache that directly interfaces with the host to service host read and write requests. In some embodiments, internal cache 220 is SRAM. In operation, internal cache 220 is temporary storage for data from host read and write operations. Media 244 is the actual memory media for the storage system. In some embodiments, the memory media is fast NAND flash. Media 244 is controlled by Media Control 240.

Commands from host system 210, e.g., Host Write 214, are first written to Fast Write Buffer (FWB) 212, a FIFO that buffers burst data being written into internal cache 220 from host system 210. FWB 212 is inserted in front of internal cache 220 because host memory blocking events tend to create a burst of write traffic which needs to be serviced quickly. In an embodiment, the transfers from host system 210 are 128 bytes (128B). In another embodiment, the transfers from host system 210 may be any size. The data exiting FWB 212, e.g., Write 216, is the data from host write 214 that is written from FWB 212 to internal cache 220. In an embodiment, the transfers in write 216 are the same size as the transfers in host write 214. In an embodiment, the transfers from FWB 212 to internal cache 220 are 128 bytes (128B). In another embodiment, the transfers from FWB 212 to internal cache 220 may be any size, as long as the size of write 216 is less than the size of Internal Cache to AWB Write 250. For example, the size of host write 214 may be 64B or 128B, while the size of Internal Cache to AWB Write 250 may be 2 KB.

Host Write Done FIFO 218 is a FIFO that buffers host write acknowledges to throttle the host writes when the SCM, e.g., SCM 130 from FIG. 1, is over utilized by the host(s). When a write enters the data FIFO of FWB 212, a write done acknowledge entry is inserted into host write done FIFO 218. Data is passed from FWB 212 to internal cache 220 as quickly as possible. In an embodiment, a host write acknowledge entry is removed from host write done FIFO 218 and sent to the host at a variable rate to throttle the host writes when the SCM is over utilized by the host(s). In an embodiment, the variable rate is determined by the fullness of the data FIFO in FWB 212. In an embodiment, the rate is immediate, i.e., there is no response delay, when FWB 212 is less than ⅛ full; the rate is a time delay interval of one entry every N*Y clock cycles (where N=fullness of FWB 212, and Y is a constant) when FWB 212 is between ⅛ and ⅞ full; and no entries are removed from host write done FIFO 218 when the FWB is greater than ⅞ full.

In an embodiment, Aging Write Buffer (AWB) 230 is a cache that holds data that is cast out of internal cache 220. In an embodiment, AWB 230 is a circular FIFO in DRAM. AWB 230 has a threshold value, and cache aggregation program 132 will remove entries from the end of AWB 230 when the number of entries in AWB 230 is larger than the threshold value. In an embodiment, if an entry being removed is not the most current (i.e., the media translate table entry does not point to it), then it is a duplicate entry and it is discarded. This reduces unneeded writes to the media. Over a short span of time, the same pages can be cast out of internal cache 220 multiple times, which would result in media write amplification. In an embodiment, to reduce this media write amplification, AWB 230 is added between internal cache 220 and MWB 232. A cast-out will first be written into AWB 230, and the same page can be written multiple times to AWB 230. When a page is removed from AWB 230 it will only be written to MWB 232 and media 244 if it is the most current version of that page, the others are discarded.

In an embodiment, MWB 232 is a cache that holds data to be programmed, or written, to the actual memory media pending programming into the media. MWB 232 is added to the cache system to avoid media open page reads. In an embodiment, MWB 232 is implemented in DRAM. All AWB cast-outs are written to MWB 232 and to media 244, and if a later read targets a recently written page then that data is read from AWB 230 or MWB 232. MWB 232 stores a copy of all the open block writes that are on media 244. A single tag points to a large area of memory, the size of which must hold the number of media pages in a block times the number of blocks in a stripe. This area is filled with write data as the media pages are written. Cache aggregation program 132 releases the large area of memory pointed to by the tag after the block stripe is fully programmed to the media.

In an embodiment, Read Cache 234 is a cache that holds data read from media 244, to be forwarded to the host in response to a host read request. Read cache 234 speeds up repopulate of internal cache 220 of a non-dirty page that was cast out then later reloaded due to SRAM cache thrashing. In an embodiment, the read cache is a circular FIFO, typically in DRAM. All media reads that are used to populate internal cache 220 will also populate read cache 234.

In an embodiment, Counting Bloom Filters 260 are hash counting filters used to detect the rare case of a read hitting an entry in the FWB. A Bloom filter is a space-efficient probabilistic data structure that is used to test whether an element is a member of a set. Counting Bloom filters 260 determine if the data for a host read operation is likely in FWB 212. When that event occurs, the read data is not available until the read data has been written from FWB 212 into the internal cache. Therefore, cache aggregation program 132 inserts the read operation into FWB 212. Since FWB 212 is a FIFO, and the read data entered the FIFO prior to the read operation, adding the suspect read operation to the write FIFO guarantees the read is executed after the write to the internal cache is executed.

The flow of data is illustrated with the arrows in FIG. 2. Host Read Data Flow 258 represents the path that data follows when a read request is received from the host that misses internal cache 220, or when a RMW is required by internal cache 220. Typically, the data will be read from read cache 234 into internal cache 220, and then forwarded to the host. In the event that the data requested by the host read operation is resident in either AWB 230 or MWB 232, host read data flow 258 can also read the data from either write buffer. Media Read Data Flow 256 represents the path that data follows when a read request is received from the host, where the data is first read out of media 244 by media control 240 and is temporarily stored in read cache 234.

When the host sends a write request to the storage, data is first written to FWB 212, and then FWB 212 writes the data to internal cache 220 as soon as possible. Internal Cache to AWB Write 250 represents the data from internal cache 220 being written into AWB 230. In the case where a partial page of the internal cache 220 needs to be cast out to AWB 230, i.e., not all lines of a page are dirty, a RMW will occur. A page is read and merged with the dirty lines in internal cache 220 prior to casting out the page to AWB 230. Next, when AWB 230 is above its threshold and the media is available then AWB Write Data Flow 252 transfers the data to both media 244 and MWB 232. Once a media block is fully written, cache aggregation program 132 will release that data from MWB 232. In an embodiment, a content-addressable memory (CAM) holds the tag to virtual address translation, so cache aggregation program 132 can release this large memory area with a single store command.

Figure 3:
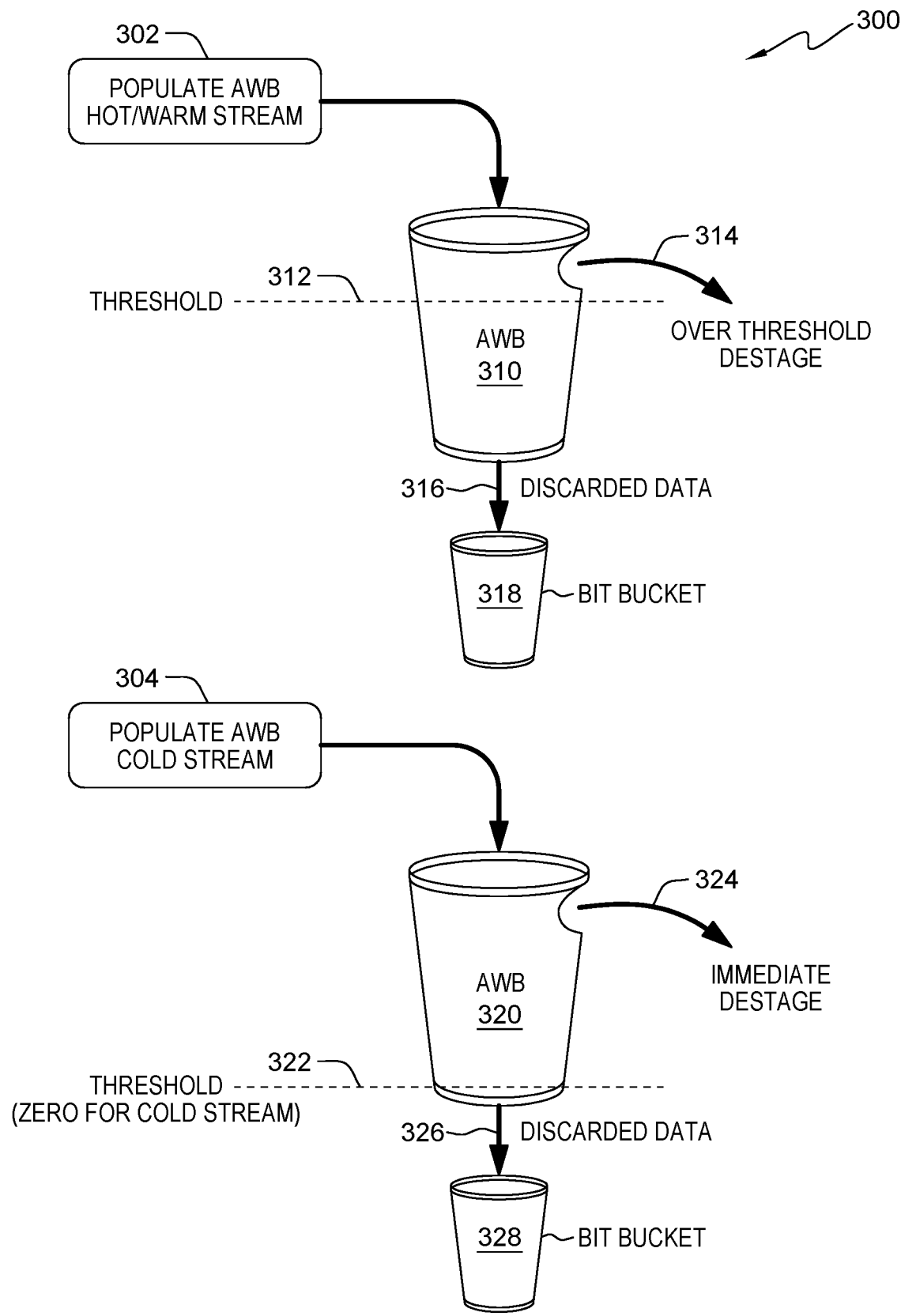
FIG. 3 is an example of the flow of data through the Aging Write Buffer (AWB) of a storage class memory, in accordance with an embodiment of the present invention.

FIG. 3 is an example of the flow of data through the AWB of a storage class memory, in accordance with an embodiment of the present invention. In the example of FIG. 3, Hot/Warm AWB 310 is an example of AWB 230 from FIG. 2. The embodiment illustrated in FIG. 3 contains two AWBs, Hot/Warm AWB 310 for the hot/warm data, and cold AWB 320 for the cold data. In an embodiment, hot/warm over threshold destage 314 is data from hot or warm data streams, i.e., data that is frequently used. Populate Hot/Warm AWB Stream 302 is the hot/warm data from the host that was written into the internal cache, e.g., internal cache 220 from FIG. 2, and is now being written into hot/warm AWB 310.

Hot/Warm Threshold 312 is a predetermined limit that cache aggregation program 132 uses to determine when to remove values from AWB 310. For hot/warm AWB 310, the hot/warm threshold is usually a non-zero number but will be set to zero during a shutdown. Hot/Warm Over Threshold Destage 314 is data that is destaged from hot/warm AWB 310 when the amount of data in AWB 310 exceeds hot/warm threshold 312. In an embodiment, the predetermined value for hot/warm threshold 312 is non-zero, and the data is held in hot/warm AWB 310 until the non-zero threshold is exceeded. In an embodiment, if an entry being removed from AWB 310 is not the most current, i.e., the entry in the media translate table, e.g., media translate table 242 from FIG. 2, does not point to it, then it is a duplicate entry of old data and it is discarded. Hot/Warm Discarded Data 316 is the data that is discarded from AWB 310. This reduces unneeded writes to the media. Bit bucket 318 illustrates the removal of discarded data 316 from AWB 310.

Cold AWB 320 is another example of AWB 230 from FIG. 2. Populate Cold AWB Stream 304 is infrequently accessed data in AWB 320, most likely migrated data from garbage collection. For data in cold AWB stream 304, cold threshold 322 is zero, and therefore data in cold AWB stream 304 will be immediately destaged to the MWB, e.g., MWB 232 from FIG. 2, and to the media, e.g., media 244 from FIG. 2, as shown by Immediate Destage 324. In this case, when there is media programming back pressure, cold AWB 320 acts as an elastic buffer between the internal cache and the media. In an embodiment, if an entry being removed from AWB 320 is not the most current, i.e., the entry in the media translate table, e.g., media translate table 242 from FIG. 2, does not point to it, then it is a duplicate entry and it is discarded. Cold Discarded Data 326 is the data that is discarded from AWB 320. This reduces unneeded writes to the media. Bit bucket 328 illustrates the removal of discarded data 326 from AWB 320.

Figure 4:
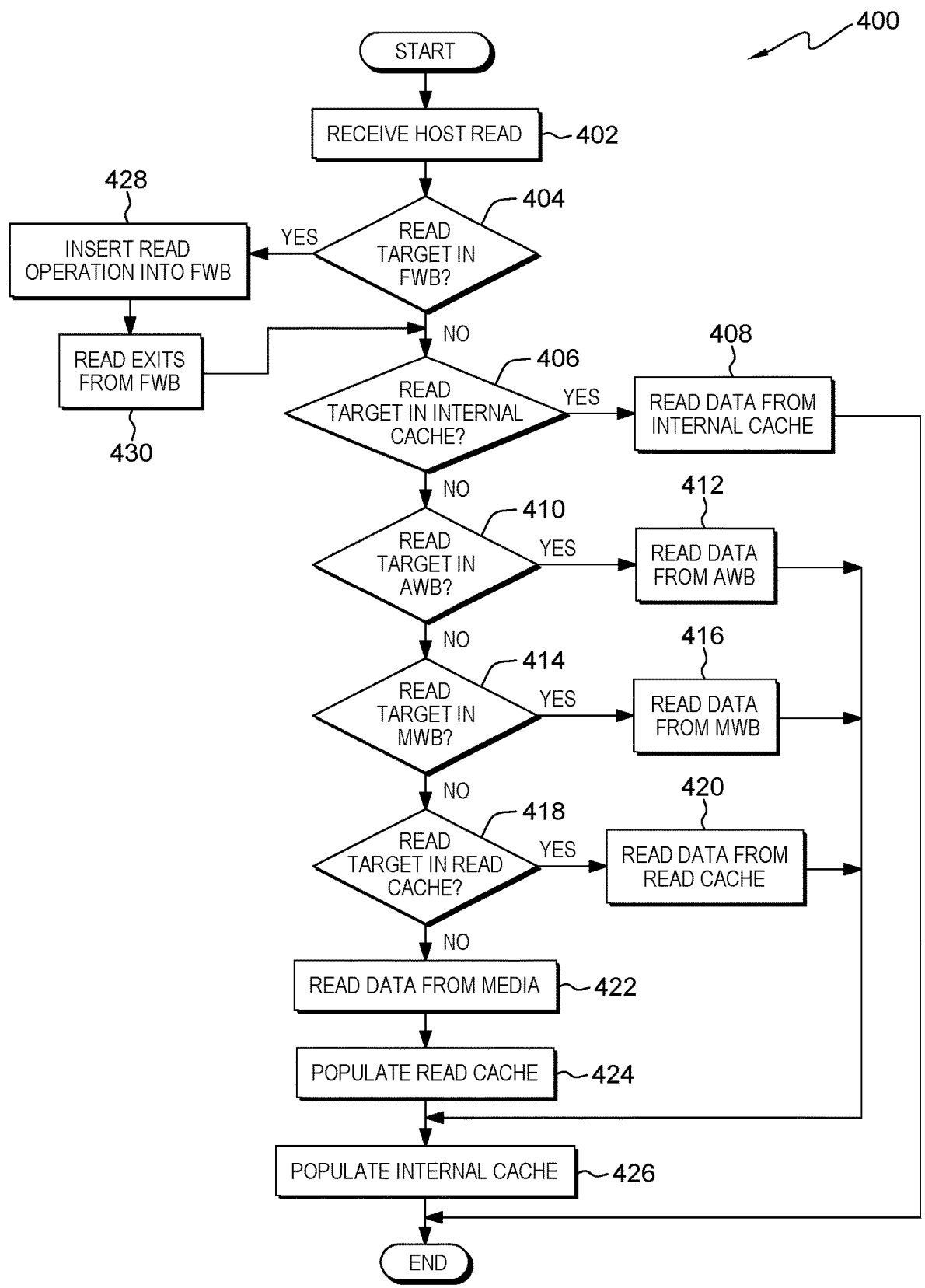
FIG. 4 represents the steps performed by the host read operation of the cache aggregation program for NV SCM data flow with mismatched block sizes, in accordance with an embodiment of the present invention.

FIG. 4 represents the steps performed by the host read operation of the cache aggregation program for NV SCM data flow with mismatched block sizes, in accordance with an embodiment of the present invention. In an alternative embodiment, the steps of workflow 400 may be performed by any other program while working with cache aggregation program 132. It should be appreciated that embodiments of the present invention provide at least for NV SCM data flow with mismatched block sizes. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 4 illustrates one possible iteration of the operational steps performed by the host read operation of cache aggregation program 132, which repeats each time a host read operation is set to be performed.

In an embodiment, cache aggregation program 132 receives a read operation from a host, e.g., host system 210 from FIG. 2. In an embodiment, cache aggregation program 132 determines if the target data for the read operation received in step 402 is, or may be, in the FWB, e.g., FWB 212 from FIG. 2. In an embodiment, cache aggregation program 132 determines if the target data for the read operation received in step 402 is in the internal cache, e.g., internal cache 220 from FIG. 2. In an embodiment, if cache aggregation program 132 determines that the target data for the read operation is in the internal cache, then cache aggregation program 132 reads the data from the internal cache and returns the data to the host. In an embodiment, cache aggregation program 132 then ends for this cycle. In an embodiment, cache aggregation program 132 determines if the target data for the read operation received in step 402 is in the AWB, e.g., AWB 230 from FIG. 2. In an embodiment, if cache aggregation program 132 determines that the target data for the read operation is in the AWB, then cache aggregation program 132 reads the data from the AWB and returns the data to the host. In an embodiment, cache aggregation program 132 determines if the target data for the read operation received in step 402 is in the MWB, e.g., MWB 232 from FIG. 2. In an embodiment, if cache aggregation program 132 determines that the target data for the read operation is in the MWB, then cache aggregation program 132 reads the data from the MWB and returns the data to the host. In an embodiment, cache aggregation program 132 determines if the target data for the read operation received in step 402 is in the read cache, e.g., read cache 234 from FIG. 2. In an embodiment, if cache aggregation program 132 determines that the target data for the read operation is in the read cache, then cache aggregation program 132 reads the data from the read cache and returns the data to the host. In an embodiment, if cache aggregation program 132 determines that the target data for the read operation is not in the internal cache, the AWB, the MWB, or the read cache, then cache aggregation program 132 reads the data from the media. In an embodiment, cache aggregation program 132 populates the read cache with the data read from the media in step 422 and returns the data to the host. In an embodiment, cache aggregation program 132 populates the internal cache with the target data. In an embodiment, if cache aggregation program 132 determines that the target data for the read operation is, or may be, in the FWB in decision block 404, then the read data is not available until the read data has been written from the FWB into the internal cache. Therefore, cache aggregation program 132 inserts the read operation into the FWB. In an embodiment, once the read operation exits from the internal cache, if the target data was in the FWB, it would have exited the FWB and be in the internal cache.

Cache aggregation program 132 receives a host read (step 402). In an embodiment, cache aggregation program 132 cache receives a read operation from a host, e.g., host system 210 from FIG. 2.

Cache aggregation program 132 determines if the read target is in the FWB (decision block 404). In an embodiment, cache aggregation program 132 determines if the target data for the read operation received in step 402 is, or may be, in the FWB, e.g., FWB 212 from FIG. 2. In an embodiment, cache aggregation program 132 determines that the target data for the read operation is in the FWB using Bloom filters, e.g., counting bloom filters 260 from FIG. 2. In an embodiment, if cache aggregation program 132 determines that the target data for the read operation is not in the FWB ("no" branch, decision block 404), then cache aggregation program 132 proceeds to decision block 406 to determine if the target data for the read operation is in the internal cache. In an embodiment, if cache aggregation program 132 determines that the target data for the read operation is or may be (since counting bloom filters do have false positives) in the FWB ("yes" branch, decision block 404), then cache aggregation program 132 proceeds to step 428.

Cache aggregation program 132 determines if the read target is in internal cache (decision block 406). In an embodiment, cache aggregation program 132 determines if the target data for the read operation received in step 402 is in the internal cache, e.g., internal cache 220 from FIG. 2. The internal cache is fully associative and uses a CAM to determine a page hit, has a valid bit to signal if a populate has occurred, i.e., all lines in the page have valid data, and has sufficient dirty bits per page to signal lines that were written by the host. A write that misses the internal cache will assign a page in the internal cache and turn on the affected dirty bits. Later when that page is cast out, a Read-Merge-Write will occur, or when a read targets that page but the line is not dirty, then a Read-Merge will occur.

In an embodiment, if cache aggregation program 132 determines that the target data for the read operation is not in the internal cache ("no" branch, decision block 406), then cache aggregation program 132 proceeds to decision block 410 to determine if the target data for the read operation is in the AWB. In an embodiment, if cache aggregation program 132 determines that the target data for the read operation is in the internal cache ("yes" branch, decision block 406), then cache aggregation program 132 proceeds to step 408 to read the data from the internal cache.

Cache aggregation program 132 reads data from the internal cache (step 408). In an embodiment, if cache aggregation program 132 determines that the target data for the read operation is in the internal cache, then cache aggregation program 132 reads the data from the internal cache and returns the data to the host. In an embodiment, cache aggregation program 132 then ends for this cycle.

Cache aggregation program 132 determines if the read target is in the AWB (decision block 410). In an embodiment, cache aggregation program 132 determines if the target data for the read operation received in step 402 is in the AWB, e.g., AWB 230 from FIG. 2. In an embodiment, cache aggregation program 132 determines the location of the data via the media translate table, e.g., media translate table 242 from FIG. 2. In an embodiment, if cache aggregation program 132 determines that the target data for the read operation is not in the AWB ("no" branch, decision block 410), then cache aggregation program 132 proceeds to decision block 414 to determine if the target data for the read operation is in the MWB. In an embodiment, if cache aggregation program 132 determines that the target data for the read operation is in the AWB ("yes" branch, decision block 410), then cache aggregation program 132 proceeds to step 412.

Cache aggregation program 132 reads the data from the AWB (step 412). In an embodiment, if cache aggregation program 132 determines that the target data for the read operation is in the AWB, then cache aggregation program 132 reads the data from the AWB and returns the data to the host. In an embodiment, cache aggregation program 132 then proceeds to step 426 to populate the internal cache with the target data.

Cache aggregation program 132 determines if the read target is in the MWB (decision block 414). In an embodiment, cache aggregation program 132 determines if the target data for the read operation received in step 402 is in the MWB, e.g., MWB 232 from FIG. 2. In an embodiment, cache aggregation program 132 determines the location of the data via the media translate table. In an embodiment, if cache aggregation program 132 determines that the target data for the read operation is not in the MWB ("no" branch, decision block 414), then cache aggregation program 132 proceeds to decision block 418 to determine if the target data for the read operation is in the read cache. In an embodiment, if cache aggregation program 132 determines that the target data for the read operation is in the MWB ("yes" branch, decision block 414), then cache aggregation program 132 proceeds to step 416.

Cache aggregation program 132 reads the data from the MWB (step 416). In an embodiment, if cache aggregation program 132 determines that the target data for the read operation is in the MWB, then cache aggregation program 132 reads the data from the MWB and returns the data to the host. In an embodiment, cache aggregation program 132 then proceeds to step 426 to populate the internal cache with the target data.

Cache aggregation program 132 determines if the read target is in the read cache (decision block 418). In an embodiment, cache aggregation program 132 determines if the target data for the read operation received in step 402 is in the read cache, e.g., read cache 234 from FIG. 2. In an embodiment, cache aggregation program 132 determines the location of the data via the media translate table. In an embodiment, if cache aggregation program 132 determines that the target data for the read operation is not in the read cache ("no" branch, decision block 418), then cache aggregation program 132 proceeds to step 422 to read the data from the media. In an embodiment, if cache aggregation program 132 determines that the target data for the read operation is in the read cache ("yes" branch, decision block 418), then cache aggregation program 132 proceeds to step 420.

Cache aggregation program 132 reads the data from the read cache (step 420). In an embodiment, if cache aggregation program 132 determines that the target data for the read operation is in the read cache, then cache aggregation program 132 reads the data from the read cache and returns the data to the host. In an embodiment, cache aggregation program 132 then proceeds to step 426 to populate the internal cache with the target data.

Cache aggregation program 132 reads the data from the media (step 422). In an embodiment, if cache aggregation program 132 determines that the target data for the read operation is not in the internal cache, the AWB, the MWB, or the read cache, then cache aggregation program 132 reads the data from the media.

Cache aggregation program 132 populates the read cache (step 424). In an embodiment, cache aggregation program 132 populates the read cache with the data read from the media in step 422 and returns the data to the host.

Cache aggregation program 132 populates the internal cache (step 426). In an embodiment, cache aggregation program 132 populates the internal cache with the target data. In an embodiment, since the internal cache page is much larger that the host read, every internal cache read miss populates the internal cache since it is expected there will be more hits on this block, and internal cache read hits are much faster than AWB, MWB, or external read cache hits. This step populates the internal cache with the read data page, or in the case where some of the lines of the internal cache page were dirty, merges the read data page with the current dirty lines of the internal cache. In an embodiment, cache aggregation program 132 then ends for this cycle.

Cache aggregation program 132 inserts the read operation into the FWB (step 428). In an embodiment, if cache aggregation program 132 determines that the target data for the read operation is, or may be, in the FWB in decision block 404, then the read data is not available until the read data has been written from the FWB into the internal cache. Therefore, cache aggregation program 132 inserts the read operation into the FWB. Since the FWB is a FIFO, and the read data entered the FIFO prior to the read operation, by the time the read operation leaves the FIFO the read data will have already been written to the internal cache.

Read operation exits from the FWB (step 430). In an embodiment, once the read operation exits from the internal cache, if the target data was in the FWB, it would have exited the FWB and be in the internal cache. In an embodiment, however, cache aggregation program 132 proceeds to decision block 406 to determine if the target data is in the internal cache since the read hit on the FWB based on the Bloom filters could be a false positive indication.

Figure 5:
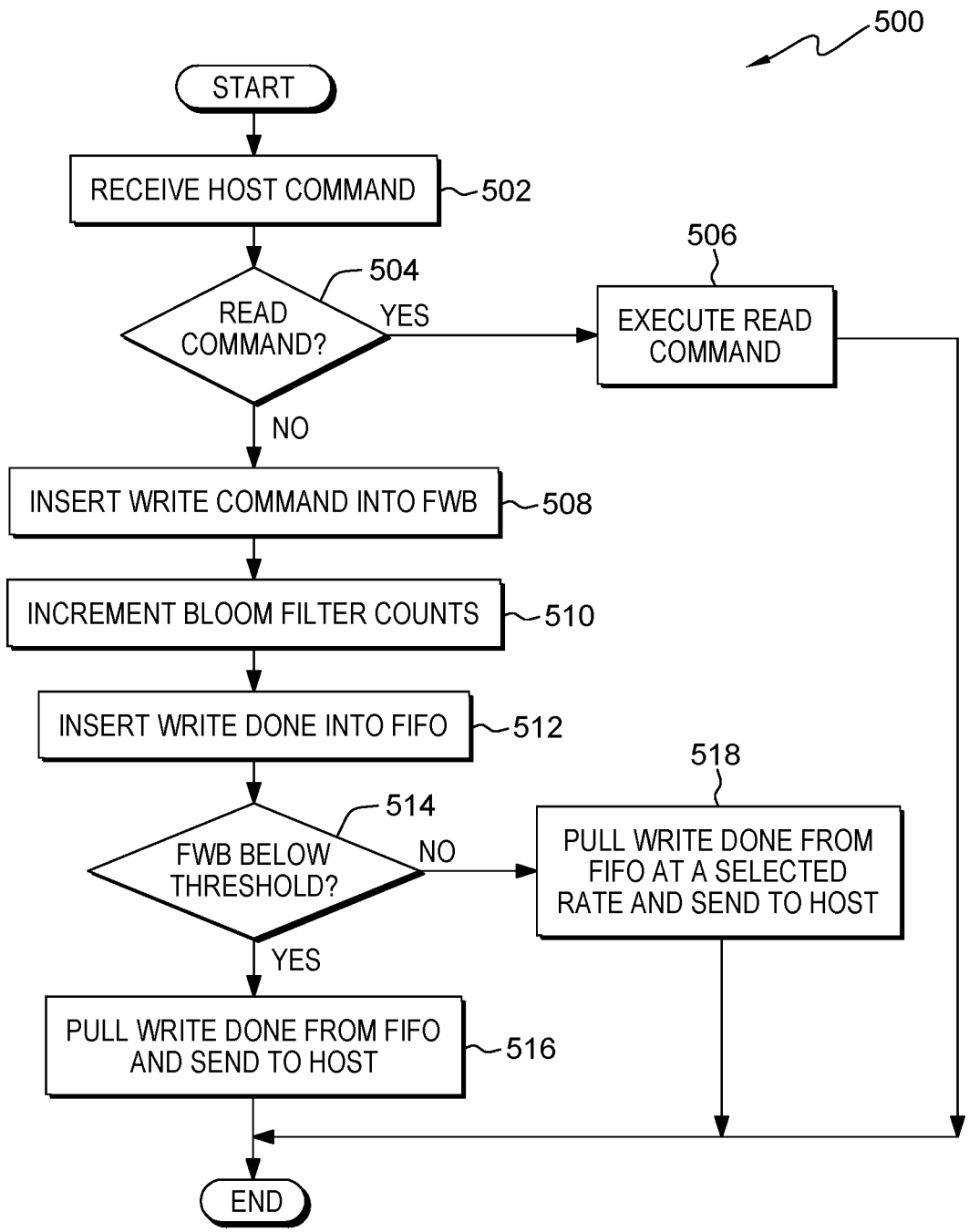
FIG. 5 represents the steps performed when a new command is received by the cache aggregation program for NV SCM data flow with mismatched block sizes, in accordance with an embodiment of the present invention.

FIG. 5 represents the steps performed when a new command is received by the cache aggregation program for NV SCM data flow with mismatched block sizes, in accordance with an embodiment of the present invention. In an alternative embodiment, the steps of workflow 500 may be performed by any other program while working with cache aggregation program 132. It should be appreciated that embodiments of the present invention provide at least for NV SCM data flow with mismatched block sizes. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 5 illustrates one possible iteration of the steps performed by cache aggregation program 132 when a new command is received, which repeats each time a new command is received.

In an embodiment, cache aggregation program 132 receives a new command, for example, a read command or a write command, from a host, e.g., host system 210 from FIG. 2. In an embodiment, cache aggregation program 132 determines if the new command from the host is a read command. In an embodiment, if the new command received from the host is a read command, then cache aggregation program 132 executes the read command using the procedure explained in FIG. 4 above. In an embodiment, cache aggregation program 132 then ends for this cycle. In an embodiment, the host write command is written into the FWB, e.g., FWB 212 from FIG. 2. In an embodiment, cache aggregation program 132 inserts the read operation into the FWB. In an embodiment as described in FIG. 2, cache aggregation program 132 enters the host write acknowledge into a host write done FIFO and sends the acknowledges back to the host at a predetermined rate based on the available capacity in the FWB. In an embodiment, cache aggregation program 132 determines if the number of entries in the FWB is below a predetermined threshold, as described in FIG. 2 above. In an embodiment, if cache aggregation program 132 determines that the number of entries in the FWB is below a predetermined threshold, then cache aggregation program 132 pulls the next command done from the FIFO and sends it to the host. In an embodiment, cache aggregation program 132 then ends for this cycle. In an embodiment, if cache aggregation program 132 determines that the number of entries in the FWB is not below a predetermined threshold, then cache aggregation program 132 pulls the next command done from the FIFO at a selected rate and sends it to the host, as described above in FIG. 2. In an embodiment, cache aggregation program 132 then ends for this cycle.

Cache aggregation program 132 receives a host command (step 502). In an embodiment, cache aggregation program 132 receives a new command, either a read command or a write command, from a host, e.g., host system 210 from FIG. 2.

Cache aggregation program 132 determines if the command is a read (decision block 504). In an embodiment, cache aggregation program 132 determines if the new command from the host is a read command. In an embodiment, if cache aggregation program 132 determines that the new command from the host is not a read command ("no" branch, decision block 504), then cache aggregation program 132 proceeds to step 508 to insert the write command into the FWB. In an embodiment, if cache aggregation program 132 determines that the new command from the host is a read command ("yes" branch, decision block 504), then cache aggregation program 132 proceeds to step 506.

Cache aggregation program 132 executes the host command (step 506). In an embodiment, if the new command received from the host is a read command, then cache aggregation program 132 executes the read command using the procedure explained in FIG. 4 above. In an embodiment, cache aggregation program 132 then ends for this cycle.

Cache aggregation program 132 inserts the write command into the FWB (step 508). In an embodiment, cache aggregation program 132 writes the host write command into the FWB, e.g., FWB 212 from FIG. 2. As described above for FIG. 2, the FWB is a FIFO to store incoming write bursts from the hosts. The host write data flows through the FWB and is written into the internal cache, e.g., internal cache 220 from FIG. 2.

Cache aggregation program 132 increment Bloom filter counts (step 510). As explained above in FIG. 2, counting bloom filters are hash counting filters used to detect the rare case of a read hitting an entry in the FWB. A Bloom filter is a space-efficient probabilistic data structure that is used to test whether an element is a member of a set. The counting bloom filters determine if the data for a host read operation is likely in the FWB. When that event occurs, the read data is not available until the read data has been written from the FWB into the internal cache. Therefore, in an embodiment, once cache aggregation program 132 inserts the write operation into the FWB in step 508, then cache aggregation program 132 increment Bloom filter counts to record the new operation.

Cache aggregation program 132 inserts a write done into a FIFO (step 512). In an embodiment, cache aggregation program 132 may throttle the responses to the host to avoid excessive host writes as described above in FIG. 2. Therefore, in an embodiment as described in FIG. 2, cache aggregation program 132 enters the host write acknowledge into a host write done FIFO and sends the acknowledges back to the host at a predetermined rate based on the available capacity in the FWB.

Cache aggregation program 132 determines if the FWB is below a threshold (decision block 514). In an embodiment, cache aggregation program 132 determines if the number of entries in the FWB is below a predetermined threshold, as described in FIG. 2 above. In an embodiment, if cache aggregation program 132 determines that the number of entries in the FWB is not below a predetermined threshold ("no" branch, decision block 514), then cache aggregation program 132 proceeds to step 518 to throttle the responses to the host. In an embodiment, if cache aggregation program 132 determines that the number of entries in the FWB is below a predetermined threshold ("yes" branch, decision block 514), then cache aggregation program 132 proceeds to step 516 to send a response to the host.

Cache aggregation program 132 pulls a write done from the FIFO and sends it to the host (step 516). In an embodiment, if cache aggregation program 132 determines that the number of entries in the FWB is below a predetermined threshold, then cache aggregation program 132 pulls the next command done from the FIFO and sends it to the host. In an embodiment, cache aggregation program 132 then ends for this cycle.

Cache aggregation program 132 pulls a write done from the FIFO at a selected rate and sends it to the host (step 518). In an embodiment, if cache aggregation program 132 determines that the number of entries in the FWB is not below a predetermined threshold, then cache aggregation program 132 pulls the next command done from the FIFO at a selected rate and sends it to the host, as described above in FIG. 2. In an embodiment, cache aggregation program 132 then ends for this cycle.

Figure 6:
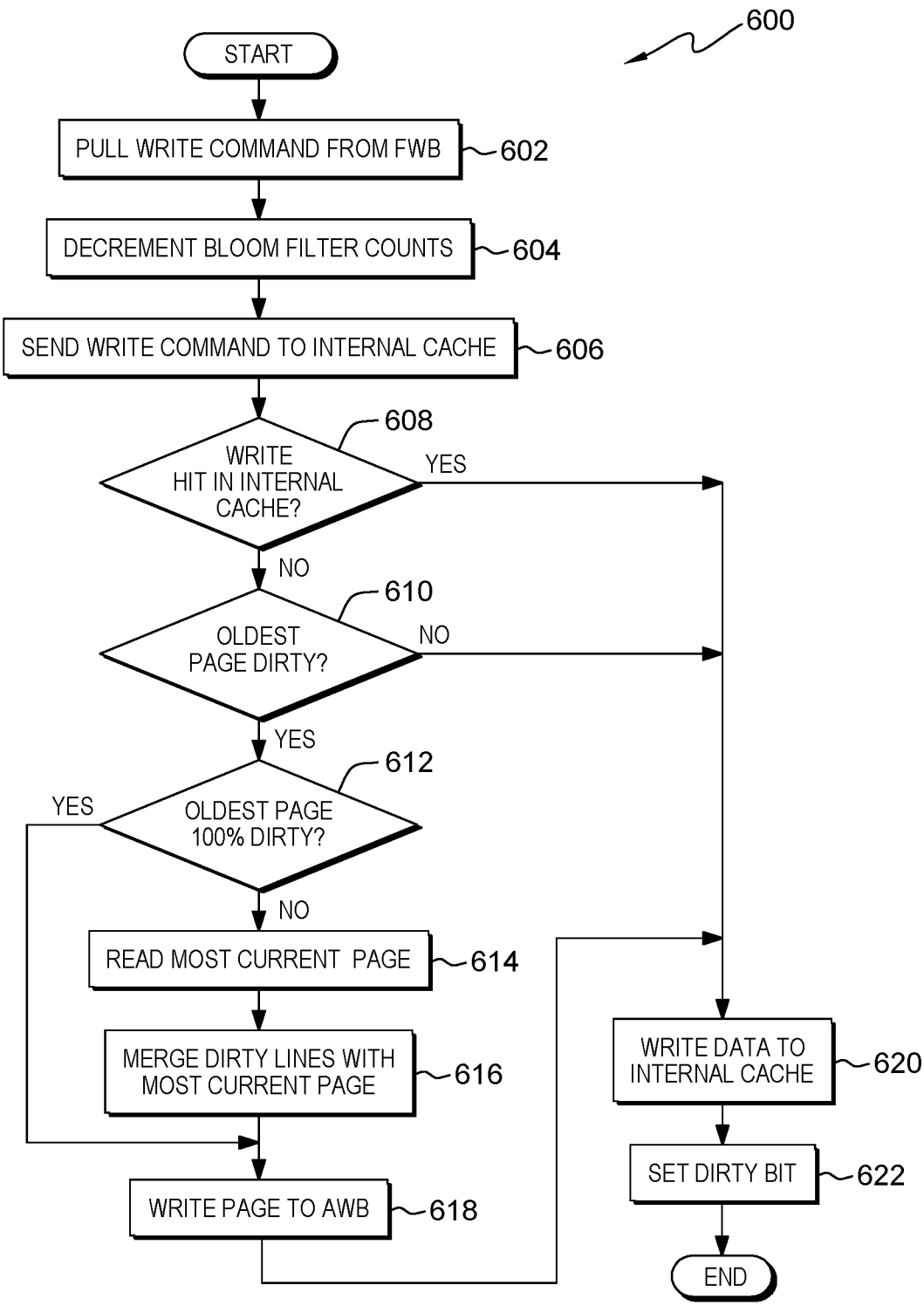
FIG. 6 represents the steps performed when a write command is pulled from the Fast Write Buffer (FWB) by the cache aggregation program for NV SCM data flow with mismatched block sizes, in accordance with an embodiment of the present invention.

FIG. 6 represents the steps performed when a write command is pulled from the FWB by cache aggregation program 132 for NV SCM data flow with mismatched block sizes, in accordance with an embodiment of the present invention. In an alternative embodiment, the steps of workflow 600 may be performed by any other program while working with cache aggregation program 132. It should be appreciated that embodiments of the present invention provide at least for NV SCM data flow with mismatched block sizes. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, if the FWB is not empty, then cache aggregation program 132 pulls the next command out of the FWB FIFO. In an embodiment, once cache aggregation program 132 pulls a command from the FWB, cache aggregation program 132 decrements the Bloom filter counts. In an embodiment, cache aggregation program 132 sends the write command to the internal cache and determines whether there is an internal cache hit. In an embodiment, cache aggregation program 132 determines if there is an internal cache hit for the target data for the write operation. In an embodiment, cache aggregation program 132 determines if the oldest page in the internal cache is dirty. In an embodiment, cache aggregation program 132 determines if the oldest page in the internal cache is 100% dirty. In an embodiment, if cache aggregation program 132 determines that a page is not 100% dirty, then cache aggregation program 132 reads the most current page from the AWB, the MWB, the read cache, or the media to update the most current page with the modified data as indicated by the dirty bits. In an embodiment, cache aggregation program 132 merges the dirty lines from the oldest page in the internal cache with the most current page to create an updated page. In an embodiment, cache aggregation program 132 writes the oldest page to the AWB, either as-is if the oldest page is 100% dirty, or the merged page if the oldest page is not 100% dirty. In an embodiment, since cache aggregation program 132 has either found a hit in the internal cache or has evicted a page from the internal cache to make room for the write data from the host, cache aggregation program 132 writes the data received from the host into the internal cache. In an embodiment, since the new data from the host has been written into the internal cache, cache aggregation program 132 sets the dirty bit for the location in internal cache where the new data from the host has been written, since this data is not yet in the media. In an embodiment, cache aggregation program 132 then ends for this cycle.

It should be appreciated that the process depicted in FIG. 6 illustrates one possible iteration of the steps performed by cache aggregation program 132 when a write command is pulled from the FWB, which repeats each time a write command is pulled from the FWB.

Cache aggregation program 132 Pulls a Write Command from the FWB (step 602). In an embodiment, if the FWB is not empty, then cache aggregation program 132 pulls the next command out of the FWB FIFO.

Cache aggregation program 132 decrements the Bloom filter counts (step 604). In an embodiment, once cache aggregation program 132 pulls a command from the FWB, cache aggregation program 132 decrements the Bloom filter counts. Decrementing the counts in the Bloom filters deletes the entry from the filters.

Cache aggregation program 132 sends the write command to the internal cache (step 606). In an embodiment, cache aggregation program 132 sends the write command to the internal cache and determines whether there is an internal cache hit.

Cache aggregation program 132 determines if the write hit in the internal cache (decision block 608). In an embodiment, cache aggregation program 132 determines if there is an internal cache hit for the target data for the write operation. A CAM is used to determine if the write hits the fully associative internal cache.

If cache aggregation program 132 determines that there is an internal cache hit for the target data ("yes" branch, decision block 608), then cache aggregation program 132 can write the data directly into the internal cache, so cache aggregation program 132 proceeds to step 620. In an embodiment, if cache aggregation program 132 determines that there is not an internal cache hit for the target data ("no" branch, decision block 608), then cache aggregation program 132 needs to evict a page from the internal cache, so cache aggregation program 132 proceeds to decision block 610 to evict a page from the internal cache.

Cache aggregation program 132 determines if the oldest page is dirty (decision block 610). In an embodiment, cache aggregation program 132 determines if the oldest page in the internal cache is dirty. A page is dirty if any of the dirty bits are set for that page. The dirty bits indicate that the page has been modified since it was read from the media, and therefore must be written to the media before it can be evicted. For example, if the internal cache page size is 2 KB and the host write size is 64B, then there are 32 dirty bits per internal cache page (2 KB÷64B).

In an embodiment, if cache aggregation program 132 determines that the oldest page in the internal cache is not dirty ("no" branch, decision block 610), then the oldest page in the internal cache can be overwritten without data loss, so cache aggregation program 132 proceeds to step 620 to write the new write data to the oldest page in the internal cache. In an embodiment, if cache aggregation program 132 determines that the oldest page in the internal cache is dirty ("yes" branch, decision block 610), then cache aggregation program 132 proceeds to decision block 612 to handle the dirty page.

Cache aggregation program 132 determines if the oldest page is 100% dirty (decision block 612). In an embodiment, cache aggregation program 132 determines if the oldest page in the internal cache is 100% dirty if all of the dirty bits for the page are set. In an embodiment, if cache aggregation program 132 determines that a page is 100% dirty ("yes" branch, decision block 612), then the entire page has been modified from the data currently stored on the media, and the page can be evicted to the AWB, so cache aggregation program 132 proceeds to step 618. In an embodiment, if cache aggregation program 132 determines that a page is not 100% dirty ("no" branch, decision block 612), then cache aggregation program 132 proceeds to step 614 to modify the page.

Cache aggregation program 132 read the most current page (step 614). In an embodiment, if the internal cache is not read populated or 100% dirty, then that page only has some valid data in it, i.e., the dirty lines have the new data, and the rest of the page is invalid data left over from the previous use of this cache page. Therefore, a RMW is required to get the previous version of the page and merge it with the new dirty lines.

Therefore, in an embodiment, if cache aggregation program 132 determines that a page is not 100% dirty, then cache aggregation program 132 reads the most current page from the AWB, the MWB, the read cache, or the media to update the most current page with the modified data as indicated by the dirty bits. In an embodiment, cache aggregation program 132 determines if there is a hit in any of the caches using the media translation table, e.g., media translate table 242 from FIG. 2. The algorithm used by cache aggregation program 132 to determine if there is a hit in any of the caches using the media translation table is described in FIG. 2 above.

Cache aggregation program 132 merges the dirty lines with the most current page (step 616). In an embodiment, cache aggregation program 132 merges the dirty lines from the oldest page in the internal cache with the most current page read in step 614 to create an updated page. The reason for this is that when an internal cache page is assigned for a new write, it is not preloaded with the most recent version of that data, instead the populate flag is turned off and the dirty bits are turned off and then the new data block is written into the internal cache and its dirty bits are turned on, the rest of the page is invalid data left over from a previous different address. This reduces the latency for writing that data into the internal cache, and if the host fully writes the page before it is evicted, then performance is improved because the read step is not needed.

Cache aggregation program 132 writes the page to the AWB (step 618). In an embodiment, cache aggregation program 132 writes the oldest page to the AWB, either as-is if the oldest page is 100% dirty, or the merged page if the oldest page is not 100% dirty. In an embodiment, if cache aggregation program 132 determines that the AWB is full, then cache aggregation program 132 waits for a page to drain out of the AWB before writing the new page into the AWB. The procedure for a page to drain out of the AWB is described in FIG. 7 below.

Cache aggregation program 132 writes the data to the internal cache (step 620). In an embodiment, since cache aggregation program 132 has either found a hit in the internal cache or has evicted a page from the internal cache to make room for the write data from the host, cache aggregation program 132 writes the data received from the host into the internal cache.

Cache aggregation program 132 sets the dirty bit (step 622). In an embodiment, since the new data from the host has been written into the internal cache, cache aggregation program 132 sets the dirty bit for the location in internal cache where the new data from the host has been written, since this data is not yet in the media. In an embodiment, cache aggregation program 132 then ends for this cycle.

Figure 7:
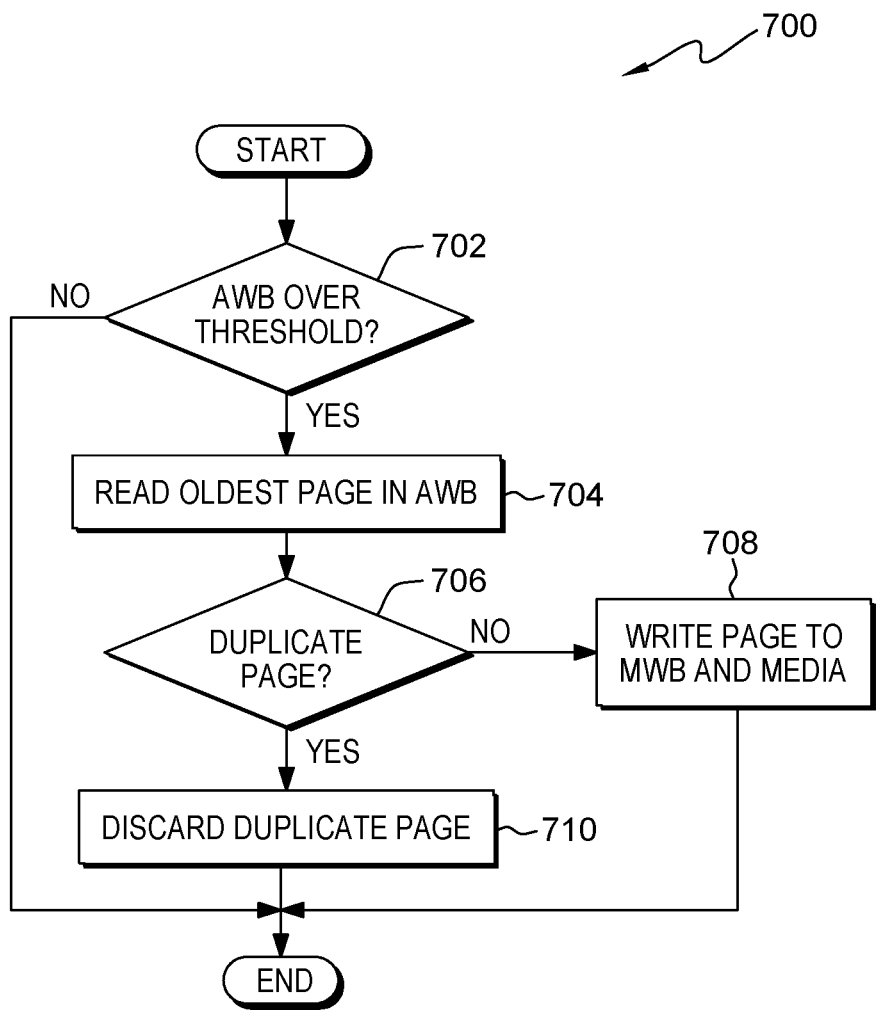
FIG. 7 represents the steps performed when the AWB is over a predetermined threshold by the cache aggregation program for NV SCM data flow with mismatched block sizes, in accordance with an embodiment of the present invention.

FIG. 7 represents the steps performed when the AWB is over a predetermined threshold by cache aggregation program 132 for NV SCM data flow with mismatched block sizes, in accordance with an embodiment of the present invention. In an alternative embodiment, the steps of workflow 700 may be performed by any other program while working with instruction cache aggregation program 132. It should be appreciated that embodiments of the present invention provide at least for NV SCM data flow with mismatched block sizes. However, FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, cache aggregation program 132 determines if the number of entries in the AWB exceeds a predetermined threshold. In an embodiment, if cache aggregation program 132 determines that the number of entries in the AWB exceeds a predetermined threshold, then cache aggregation program 132 read the oldest page from the AWB. In an embodiment, cache aggregation program 132 determines if the page read from the AWB in step 704 is a duplicate. In an embodiment, if cache aggregation program 132 determines that the page read from the AWB in step 704 is not a duplicate, then cache aggregation program 132 writes the page into both the MWB and the media. In an embodiment, cache aggregation program 132 then ends for this cycle. In an embodiment, if cache aggregation program 132 determines that the page read from the AWB in step 704 is a duplicate, then cache aggregation program 132 discards the entry. In an embodiment, cache aggregation program 132 then ends for this cycle.

It should be appreciated that the process depicted in FIG. 7 illustrates one possible iteration of the steps performed by cache aggregation program 132 the AWB is over a predetermined threshold, which repeats as long as the AWB is over the threshold.

Cache aggregation program 132 determines if the AWB is over a threshold (decision block 702). In an embodiment, cache aggregation program 132 determines if the number of entries in the AWB exceeds a predetermined threshold. In an embodiment, if cache aggregation program 132 determines that the number of entries in the AWB does not exceed a predetermined threshold ("no" branch, decision block 702), then cache aggregation program 132 then ends for this cycle. In an embodiment, if cache aggregation program 132 determines the number of entries in the AWB does exceed a predetermined threshold ("yes" branch, decision block 702), then cache aggregation program 132 proceeds to step 704.

Cache aggregation program 132 reads the oldest page in the AWB (step 704). In an embodiment, if cache aggregation program 132 determines that the number of entries in the AWB exceeds a predetermined threshold, then cache aggregation program 132 read the oldest page from the AWB. In an embodiment, the AWB is a circular FIFO.

Cache aggregation program 132 determines if the page is a duplicate page (decision block 706). In an embodiment, cache aggregation program 132 determines if the page read from the AWB in step 704 is a duplicate. In an embodiment, if an entry being removed from the AWB is not the most current, i.e., the entry in the media translate table, e.g., media translate table 242 from FIG. 2, does not point to it, then it is a duplicate entry of old data. In an embodiment, if cache aggregation program 132 determines that the page read from the AWB in step 704 is a not duplicate ("no" branch, decision block 706), then cache aggregation program 132 proceeds to step 708. In an embodiment, if cache aggregation program 132 determines that the page read from the AWB in step 704 is a duplicate ("yes" branch, decision block 706), then cache aggregation program 132 proceeds to step 710.

Cache aggregation program 132 writes the page to the MWB and media (step 708). In an embodiment, if cache aggregation program 132 determines that the page read from the AWB in step 704 is not a duplicate, then cache aggregation program 132 writes the page into both the MWB and the media. In an embodiment, cache aggregation program 132 then ends for this cycle.

Cache aggregation program 132 discards the duplicate page (step 710). In an embodiment, if cache aggregation program 132 determines that the page read from the AWB in step 704 is a duplicate, then cache aggregation program 132 discards the entry. In an embodiment, cache aggregation program 132 then ends for this cycle.

Figure 8:
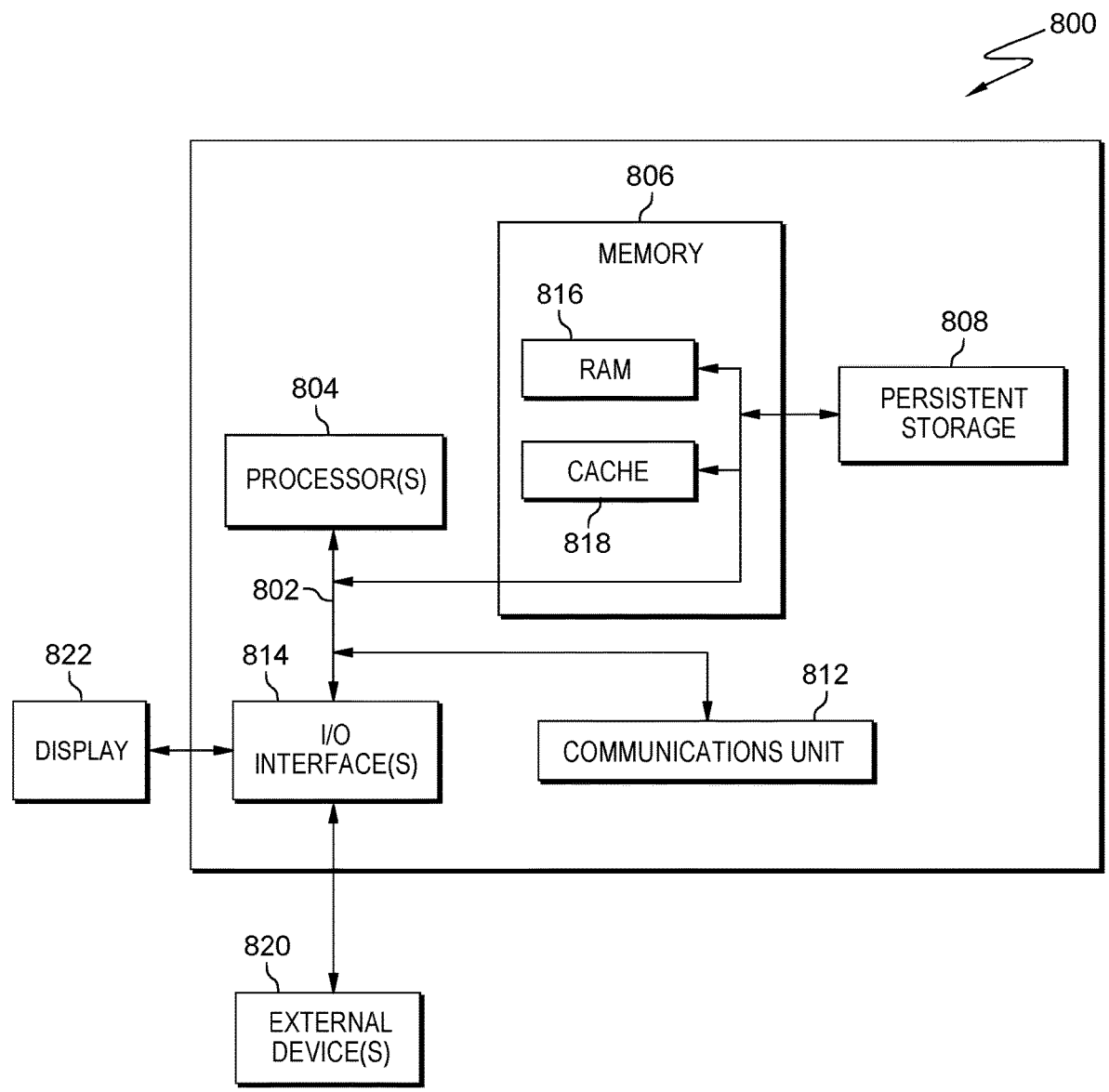
FIG. 8 depicts a block diagram of components of the computing device executing the cache aggregation program within the distributed data processing environment of FIG. 1, in accordance with an embodiment of the present invention.

FIG. 8 is a block diagram depicting components of computing device 110 suitable for cache aggregation program 132, in accordance with at least one embodiment of the invention. FIG. 8 displays computer 800; one or more processor(s) 804 (including one or more computer processors); communications fabric 802; memory 806, including random-access memory (RAM) 816 and cache 818; persistent storage 808; communications unit 812; I/O interfaces 814; display 822; and external devices 820. It should be appreciated that FIG. 8 provides only an illustration of one embodiment and does not imply any limitations with regard to the environments in which different embodiments may be implemented. Many modifications to the depicted environment may be made.

As depicted, computer 800 operates over communications fabric 802, which provides communications between computer processor(s) 804, memory 806, persistent storage 808, communications unit 812, and I/O interface(s) 814. Communications fabric 802 may be implemented with any architecture suitable for passing data or control information between processors 804 (e.g., microprocessors, communications processors, and network processors), memory 806, external devices 820, and any other hardware components within a system. For example, communications fabric 802 may be implemented with one or more buses.

Memory 806 and persistent storage 808 are computer readable storage media. In the depicted embodiment, memory 806 comprises RAM 816 and cache 818. In general, memory 806 can include any suitable volatile or non-volatile computer readable storage media. Cache 818 is a fast memory that enhances the performance of processor(s) 804 by holding recently accessed data, and near recently accessed data, from RAM 816.

Program instructions for cache aggregation program 132 may be stored in persistent storage 808, or more generally, any computer readable storage media, for execution by one or more of the respective computer processors 804 via one or more memories of memory 806. Persistent storage 808 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 812, in these examples, provides for communications with other data processing systems or devices. In these examples, communications unit 812 includes one or more network interface cards. Communications unit 812 may provide communications through the use of either or both physical and wireless communications links. In the context of some embodiments of the present invention, the source of the various input data may be physically remote to computer 800 such that the input data may be received, and the output similarly transmitted via communications unit 812.

I/O interface(s) 814 allows for input and output of data with other devices that may be connected to computer 800. For example, I/O interface(s) 814 may provide a connection to external device(s) 820 such as a keyboard, a keypad, a touch screen, a microphone, a digital camera, and/or some other suitable input device. External device(s) 820 can also include portable computer readable storage media such as, for example, thumb drives, portable optical or magnetic disks, and memory cards. Software and data used to practice embodiments of the present invention, e.g., cache aggregation program 132, can be stored on such portable computer readable storage media and can be loaded onto persistent storage 808 via I/O interface(s) 814. I/O interface(s) 814 also connect to display 822.

Display 822 provides a mechanism to display data to a user and may be, for example, a computer monitor. Display 822 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    responsive to receiving a command from a host on a memory controller for a storage class memory, determining, by one or more computer processors, whether the command is a write command;
    responsive to determining that the command is the write command, inserting, by the one or more computer processors, the write command into a Fast Write Buffer (FWB), wherein the write command contains a write data, and further wherein the FWB holds the write command prior to storing the write data in an internal cache;
    responsive to the write command exiting the FWB, determining, by the one or more computer processors, whether the write command generates a cache hit from the internal cache, wherein the cache hit indicates that an address of the write data in the write command is in the internal cache;
    responsive to determining that the write command generates the cache hit from the internal cache, writing, by the one or more computer processors, the write data into the internal cache;
    responsive to determining that the write command does not generate the cache hit from the internal cache, determining, by the one or more computer processors, whether an oldest cache page in the internal cache is dirty, wherein the oldest cache page in the internal cache is dirty if it has been modified since it was read from a memory media; and
    responsive to determining that the oldest cache page in the internal cache is dirty, writing, by the one or more computer processors, a modified oldest cache page to the internal cache and an Aging Write Buffer (AWB), wherein the AWB holds one or more pages cast out from the internal cache, and further wherein the modified oldest cache page is a most current page updated with a modified data from the internal cache.

2. The computer-implemented method of claim 1, wherein responsive to receiving the command from the host on the memory controller for the storage class memory, determining whether the command is the write command further comprises:
    responsive to determining that the command is a read command, determining, by the one or more computer processors, a location of a read data from the read command, wherein the location is selected from the group consisting of the internal cache, the FWB, the AWB, a Media Write Buffer (MWB), or a read cache;
    responsive to determining that the location is the internal cache, reading, by the one or more computer processors, the read data from the internal cache;
    responsive to determining that the location is the AWB, reading, by the one or more computer processors, the read data from the AWB, writing the read data into the internal cache, and returning the read data to the host;
    responsive to determining that the location is the MWB, reading, by the one or more computer processors, the read data from the MWB, writing the read data into the internal cache, and returning the read data to the host, wherein the MWB holds one or more pages cast out from the AWB to avoid one or more open page reads; and
    responsive to determining that the location is the read cache, reading, by the one or more computer processors, the read data from the read cache, writing the read data into the internal cache, and returning the read data to the host.

3. The computer-implemented method of claim 2, wherein responsive to determining that the command is the read command, determining the location of the read data from the read command, wherein the location is selected from the group consisting of the internal cache, the FWB, the AWB, the MWB, or the read cache comprises:
    responsive to determining that the location of the read data is the FWB, determining, by the one or more computer processors, if the read command has exited the FWB; and
    responsive to determining that the read command has exited the FWB, determining, by the one or more computer processors, the location of the read data from the read command, wherein the location of the read data from the read command is selected from the group consisting of the internal cache, the AWB, the MWB, or the read cache.

4. The computer-implemented method of claim 1, wherein one or more hash counting Bloom filters are used to determine whether a location of a read data is the FWB.

5. The computer-implemented method of claim 1, wherein responsive to determining that the oldest cache page in the internal cache is dirty, writing the modified oldest cache page to the internal cache and the AWB, wherein the AWB holds the one or more pages cast out from the internal cache, and further wherein the modified oldest cache page is the most current page updated with the modified data from the internal cache comprises:
responsive to determining that the oldest cache page in the internal cache is not dirty, writing, by the one or more computer processors, the write data into the internal cache;
responsive to determining that the oldest cache page in the internal cache is dirty, determining, by the one or more computer processors, whether the oldest cache page in the internal cache is 100% dirty, wherein the oldest cache page in the internal cache is 100% dirty if a dirty bit is set for each memory block of the oldest cache page, wherein the dirty bit indicates whether the memory block has been modified;
responsive to determining that the oldest cache page in the internal cache is not 100% dirty, reading, by the one or more computer processors, the most current page, wherein a location of the most current page is determined from a media translation table;
responsive to reading the most current page, merging, by the one or more computer processors, the most current page with one or more modifications to create the modified oldest cache page, wherein the one or more modifications are determined from the dirty bit for each memory block of the oldest cache page; and
responsive to merging the most current page with the one or more modifications to create the modified oldest cache page, writing, by the one or more computer processors, the oldest cache page to the internal cache and the AWB.

6. The computer-implemented method of claim 1, wherein responsive to determining that the command is the write command, inserting the write command into the FWB, wherein the write command contains the write data, and further wherein the FWB holds the write command prior to storing the write data in the internal cache further comprises:
inserting, by the one or more computer processors, a host write acknowledge entry into a write done FIFO;
determining, by the one or more computer processors, a time delay interval for a variable host response rate based on a fullness of the FWB, wherein the time delay is a number of clock cycles; and
responsive to determining that the write done FIFO is not empty, removing, by the one or more computer processors, at each time delay interval one host write acknowledge entry from the write done FIFO and sending the one host write acknowledge entry to the host.

7. The computer-implemented method of claim 1, further comprising:
determining, by the one or more computer processors, whether the AWB exceeds a predetermined fullness threshold;
responsive to determining that the AWB exceeds the predetermined fullness threshold, reading, by the one or more computer processors, an oldest buffer page in the AWB;
determining, by the one or more computer processors, whether the oldest buffer page in the AWB is a duplicate page based on an entry in a media translation table;
responsive to determining that the oldest buffer page in the AWB is the duplicate page, discarding, by the one or more computer processors, the oldest buffer page in the AWB; and
responsive to determining that the oldest buffer page in the AWB is not the duplicate page, writing, by the one or more computer processors, the oldest buffer page in the AWB to a Media Write Buffer (MWB) and the memory media.

8. A computer program product comprising one or more computer readable storage media and program instructions stored on the one or more computer readable storage media, the program instructions including instructions to:
responsive to receiving a command from a host on a memory controller for a storage class memory, determine whether the command is a write command;
responsive to determining that the command is the write command, insert the write command into a Fast Write Buffer (FWB), wherein the write command contains a write data, and further wherein the FWB holds the write command prior to storing the write data in an internal cache;
responsive to the write command exiting the FWB, determine whether the write command generates a cache hit from the internal cache, wherein the cache hit indicates that an address of the write data in the write command is in the internal cache;
responsive to determining that the write command generates the cache hit from the internal cache, write the write data into the internal cache;
responsive to determining that the write command does not generate the cache hit from the internal cache, determine whether an oldest cache page in the internal cache is dirty, wherein the oldest cache page in the internal cache is dirty if it has been modified since it was read from a memory media; and
responsive to determining that the oldest cache page in the internal cache is dirty, write a modified oldest cache page to the internal cache and an Aging Write Buffer (AWB), wherein the AWB holds one or more pages cast out from the internal cache, and further wherein the modified oldest cache page is a most current page updated with a modified data from the internal cache.

9. The computer program product of claim 8, wherein responsive to receiving the command from the host on the memory controller for the storage class memory, determine whether the command is the write command further comprises one or more of the following program instructions, stored on the one or more computer readable storage media, to:
responsive to determining that the command is a read command, determine a location of a read data from the read command, wherein the location is selected from the group consisting of the internal cache, the FWB, the AWB, a Media Write Buffer (MWB), or a read cache;
responsive to determining that the location is the internal cache, read the read data from the internal cache;
responsive to determining that the location is the AWB, read the read data from the AWB, write the read data into the internal cache, and return the read data to the host;
responsive to determining that the location is the MWB, read the read data from the MWB, write the read data into the internal cache, and return the read data to the host, wherein the MWB holds one or more pages cast out from the AWB to avoid one or more open page reads; and
responsive to determining that the location is the read cache, read the read data from the read cache, write the read data into the internal cache, and return the read data to the host.

10. The computer program product of claim 9, wherein responsive to determining that the command is the read command, determine the location of the read data from the read command, wherein the location is selected from the group consisting of the internal cache, the FWB, the AWB, the MWB, or the read cache comprises one or more of the following program instructions, stored on the one or more computer readable storage media, to:
- responsive to determining that the location of the read data is the FWB, determine if the read command has exited the FWB; and
- responsive to determining that the read command has exited the FWB, determine the location of the read data from the read command, wherein the location of the read data from the read command is selected from the group consisting of the internal cache, the AWB, the MWB, or the read cache.

11. The computer program product of claim 8, wherein one or more hash counting Bloom filters are used to determine whether a location of a read data is the FWB.

12. The computer program product of claim 8, wherein responsive to determining that the oldest cache page in the internal cache is dirty, write the modified oldest cache page to the internal cache and the AWB, wherein the AWB holds the one or more pages cast out from the internal cache, and further wherein the modified oldest cache page is the most current page updated with the modified data from the internal cache comprises one or more of the following program instructions, stored on the one or more computer readable storage media, to:
- responsive to determining that the oldest cache page in the internal cache is not dirty, write the write data into the internal cache;
- responsive to determining that the oldest cache page in the internal cache is dirty, determine whether the oldest cache page in the internal cache is 100% dirty, wherein the oldest cache page in the internal cache is 100% dirty if a dirty bit is set for each memory block of the oldest cache page, wherein the dirty bit indicates whether the memory block has been modified;
- responsive to determining that the oldest cache page in the internal cache is not 100% dirty, read the most current page, wherein a location of the most current page is determined from a media translation table;
- responsive to reading the most current page, merge the most current page with one or more modifications to create the modified oldest cache page, wherein the one or more modifications are determined from the dirty bit for each memory block of the oldest cache page; and
- responsive to merging the most current page with the one or more modifications to create the modified oldest cache page, write the oldest cache page to the internal cache and the AWB.

13. The computer program product of claim 8, wherein responsive to determining that the command is the write command, insert the write command into the FWB, wherein the write command contains the write data, and further wherein the FWB holds the write command prior to storing the write data in the internal cache further comprises one or more of the following program instructions, stored on the one or more computer readable storage media, to:
- insert a host write acknowledge entry into a write done FIFO;
- determine a time delay interval for a variable host response rate based on a fullness of the FWB, wherein the time delay is a number of clock cycles; and
- responsive to determining that the write done FIFO is not empty, remove at each time delay interval one host write acknowledge entry from the write done FIFO and send the one host write acknowledge entry to the host.

14. The computer program product of claim 8, further comprising one or more of the following program instructions, stored on the one or more computer readable storage media, to:
- determine whether the AWB exceeds a predetermined fullness threshold;
- responsive to determining that the AWB exceeds the predetermined fullness threshold, read an oldest buffer page in the AWB;
- determine whether the oldest buffer page in the AWB is a duplicate page based on an entry in a media translation table;
- responsive to determining that the oldest buffer page in the AWB is the duplicate page, discard the oldest buffer page in the AWB; and
- responsive to determining that the oldest buffer page in the AWB is not the duplicate page, write the oldest buffer page in the AWB to a Media Write Buffer (MWB) and the memory media.

15. A computer system comprising:
one or more computer processors;
one or more computer readable storage media; and
program instructions stored on the one or more computer readable storage media for execution by at least one of the one or more computer processors, the stored program instructions including instructions to:
- responsive to receiving a command from a host on a memory controller for a storage class memory, determine whether the command is a write command;
- responsive to determining that the command is the write command, insert the write command into a Fast Write Buffer (FWB), wherein the write command contains a write data, and further wherein the FWB holds the write command prior to storing the write data in an internal cache;
- responsive to the write command exiting the FWB, determine whether the write command generates a cache hit from the internal cache, wherein the cache hit indicates that an address of the write data in the write command is in the internal cache;
- responsive to determining that the write command generates the cache hit from the internal cache, write the write data into the internal cache;
- responsive to determining that the write command does not generate the cache hit from the internal cache, determine whether an oldest cache page in the internal cache is dirty, wherein the oldest cache page in the internal cache is dirty if it has been modified since it was read from a memory media; and
- responsive to determining that the oldest cache page in the internal cache is dirty, write a modified oldest cache page to the internal cache and an Aging Write Buffer (AWB), wherein the AWB holds one or more pages cast out from the internal cache, and further wherein the modified oldest cache page is a most current page updated with a modified data from the internal cache.

16. The computer system of claim 15, wherein responsive to receiving the command from the host on the memory controller for the storage class memory, determine whether the command is the write command further comprises one or more of the following program instructions, stored on the one or more computer readable storage media, to:

responsive to determining that the command is a read command, determine a location of a read data from the read command, wherein the location is selected from the group consisting of the internal cache, the FWB, the AWB, a Media Write Buffer (MWB), or a read cache;
responsive to determining that the location is the internal cache, read the read data from the internal cache;
responsive to determining that the location is the AWB, read the read data from the AWB, write the read data into the internal cache, and return the read data to the host;
responsive to determining that the location is the MWB, read the read data from the MWB, write the read data into the internal cache, and return the read data to the host, wherein the MWB holds one or more pages cast out from the AWB to avoid one or more open page reads; and
responsive to determining that the location is the read cache, read the read data from the read cache, write the read data into the internal cache, and return the read data to the host.

17. The computer system of claim 16, wherein responsive to determining that the command is the read command, determine the location of the read data from the read command, wherein the location is selected from the group consisting of the internal cache, the FWB, the AWB, the MWB, or the read cache comprises one or more of the following program instructions, stored on the one or more computer readable storage media, to:
responsive to determining that the location of the read data is the FWB, determine if the read command has exited the FWB; and
responsive to determining that the read command has exited the FWB, determine the location of the read data from the read command, wherein the location of the read data from the read command is selected from the group consisting of the internal cache, the AWB, the MWB, or the read cache.

18. The computer system of claim 15, wherein responsive to determining that the oldest cache page in the internal cache is dirty, write the modified oldest cache page to the internal cache and the AWB, wherein the AWB holds the one or more pages cast out from the internal cache, and further wherein the modified oldest cache page is the most current page updated with the modified data from the internal cache comprises one or more of the following program instructions, stored on the one or more computer readable storage media, to:
responsive to determining that the oldest cache page in the internal cache is not dirty, write the write data into the internal cache;
responsive to determining that the oldest cache page in the internal cache is dirty, determine whether the oldest cache page in the internal cache is 100% dirty, wherein the oldest cache page in the internal cache is 100% dirty if a dirty bit is set for each memory block of the oldest cache page, wherein the dirty bit indicates whether the memory block has been modified;
responsive to determining that the oldest cache page in the internal cache is not 100% dirty, read the most current page, wherein a location of the most current page is determined from a media translation table;
responsive to reading the most current page, merge the most current page with one or more modifications to create the modified oldest cache page, wherein the one or more modifications are determined from the dirty bit for each memory block of the oldest cache page; and
responsive to merging the most current page with the one or more modifications to create the modified oldest cache page, write the oldest cache page to the internal cache and the AWB.

19. The computer system of claim 15, wherein responsive to determining that the command is the write command, insert the write command into the FWB, wherein the write command contains the write data, and further wherein the FWB holds the write command prior to storing the write data in the internal cache further comprises one or more of the following program instructions, stored on the one or more computer readable storage media, to:
insert a host write acknowledge entry into a write done FIFO;
determine a time delay interval for a variable host response rate based on a fullness of the FWB, wherein the time delay is a number of clock cycles; and
responsive to determining that the write done FIFO is not empty, remove at each time delay interval one host write acknowledge entry from the write done FIFO and send the one host write acknowledge entry to the host.

20. The computer system of claim 15, further comprising one or more of the following program instructions, stored on the one or more computer readable storage media, to:
determine whether the AWB exceeds a predetermined fullness threshold;
responsive to determining that the AWB exceeds the predetermined fullness threshold, read an oldest buffer page in the AWB;
determine whether the oldest buffer page in the AWB is a duplicate page based on an entry in a media translation table;
responsive to determining that the oldest buffer page in the AWB is the duplicate page, discard the oldest buffer page in the AWB; and
responsive to determining that the oldest buffer page in the AWB is not the duplicate page, write the oldest buffer page in the AWB to a Media Write Buffer (MWB) and the memory media.

* * * * *